United States Patent [19]

Aykut

[11] 4,257,299

[45] Mar. 24, 1981

[54] MEANS FOR MOVING A ROTARY KNIFE IN APPARATUS FOR CUTTING PAPER SHEETS OR THE LIKE

[75] Inventor: Kurt Aykut, Hamburg, Fed. Rep. of Germany

[73] Assignee: E. C. H. Will (GmbH & Co.), Hamburg, Fed. Rep. of Germany

[21] Appl. No.: 38,059

[22] Filed: May 11, 1979

[30] Foreign Application Priority Data

May 19, 1978 [DE] Fed. Rep. of Germany ....... 2821956

[51] Int. Cl.[3] ............ B23D 19/04

[52] U.S. Cl. ............ 83/482; 83/499; 83/504

[58] Field of Search ............ 83/469, 482, 496, 497, 83/499, 504

[56] References Cited

U.S. PATENT DOCUMENTS

| | | | |
|---|---|---|---|
| 2,571,201 | 10/1951 | Clem | 83/482 |
| 3,186,281 | 6/1965 | Wingen | 83/469 |
| 3,380,330 | 3/1968 | Gilmore | 83/504 |
| 3,685,379 | 8/1972 | Frye | 83/497 |
| 3,892,156 | 7/1975 | Johnstone | 83/482 |

*Primary Examiner*—J. M. Meister
*Assistant Examiner*—K. Bradford Adolphson
*Attorney, Agent, or Firm*—Peter K. Kontler

[57] ABSTRACT

Apparatus for cutting a running web of paper or the like has a rotary disk-shaped first knife and a driven counterknife. The first knife is rotatable on a shaft which constitutes the piston rod of a double-acting pneumatic cylinder and piston unit. The cylinder of such unit is connected with a second piston rod forming part of a single-acting cylinder and piston unit. The control system for the two units includes a shutoff valve which can admit compressed air to the single-acting unit whereby the pressure in a first conduit which connects the source of compressed air with the single-acting unit rises when the second piston rod reaches an end position in which the marginal portion of the first knife overlaps but is remote from the marginal portion of the counterknife. A second conduit thereupon admits compressed air to the double-acting unit in order to move the first knife axially against the counterknife. The second conduit contains a valve which is responsive to increased pressure of air in the first conduit to insure that the first knife is shifted against the counterknife only when the second piston rod reaches its end position. The double-acting unit holds the first knife away from the counterknife while the single-acting unit moves the second piston rod to its end position.

10 Claims, 3 Drawing Figures

MEANS FOR MOVING A ROTARY KNIFE IN APPARATUS FOR CUTTING PAPER SHEETS OR THE LIKE

BACKGROUND OF THE INVENTION

The present invention relates to apparatus for cutting paper sheets or the like, especially for severing running webs of paper to form elongated strips which are thereupon subdivided into smaller sheets of the type used in steno pads, note books or the like. More particularly, the invention relates to improvements in means for moving a rotary knife of such cutting apparatus with reference to a rotary counterknife.

It is already known to sever a running paper web in an apparatus wherein a driven counterknife cooperates with a disk-shaped knife which is freely rotatable on its shaft. The apparatus comprises a first motor which moves the knife sideways (i.e., substantially at right angles to its axis) toward and away from the counterknife, and a second motor which thereupon moves the knife axially into engagement with the counterknife so that the latter transmits torque to the rotary knife while the two implements cooperate to cut the running web. In such apparatus, sidewise movement of the rotary knife must be terminated prior to start of the axial movement in order to insure that the cutting edge of the rotary knife does not strike against the counterknife. As a rule, to extent to which the marginal portions of the two implements overlap when the rotary knife has completed its sidewise movement toward the counterknife is in the range of one millimeter. Such minute overlap suffices to result in damage to the rotary knife and/or counterknife if the rotary knife is permitted to strike against the counterknife during sidewise movement toward the counterknife.

A proposal to avoid undesirable contact between the two implements during sidewise movement of the rotary knife is disclosed in German Auslegeschrift No. 1,156,635. Each of the two motors is a pneumatic motor and both motors receive pressurized fluid from a common source. The pistons of both motors are biased by springs, and the bias of the springs is selected in such a way that, when the source is free to admit pressurized fluid to both motors, the piston of the first motor is displaced prior to displacement of the piston which forms part of the second motor. This is achieved by appropriate selection of the bias of springs for the respective pistons.

A drawback of the just described proposal is that the piston of the second motor is displaced by fluid which is maintained at an elevated pressure. Therefore, the apparatus must be provided with a stop to arrest the axial movement of the rotary knife in a direction toward engagement with the counterknife. The rotary knife is free to wobble on its shaft and is biased by a dished spring which determines the pressure between the two implements in actual use of the apparatus.

In accordance with a further prior proposal, the piston of the second motor is not biased by a spring.

OBJECTS AND SUMMARY OF THE INVENTION

An object of the invention is to provide a novel and improved cutting apparatus wherein the piston of the second motor need not be biased by a spring and wherein the admission of pressurized fluid to the two motors is effected by resorting to a simple, compact and reliable control system.

Another object of the invention is to provide the control system with novel and improved means for insuring that the movements of the rotary knife with reference to the counterknife are carried out in an optimum sequence, not only when the rotary knife moves toward but also when the rotary knife moves away from its operative position.

A further object of the invention is to provide a cutting apparatus wherein the force with which the rotary knife bears against the counterknife when the apparatus is in use can be varied in a simple, reliable and efficient manner.

An additional object of the invention is to provide novel and improved fluid-operated motors for use in a cutting apparatus of the above-outlined character.

Another object of the invention is to provide a cutting apparatus wherein the sidewise movement of the rotary knife is invariably completed before the rotary knife begins to move axially toward engagement with the driven counterknife.

A further object of the invention is to provide a cutting apparatus wherein the rotary knife need not wobble with reference to its shaft.

The invention is embodied in an apparatus for cutting paper or the like, especially for cutting a running web of paper which is drawn off a bobbin and is to be converted into sheets of note books or the like. The apparatus comprises a first rotary knife, carrier means for the first knife, a rotary second knife, a first fluid-operated motor which is actuatable to move the carrier means with respect to the second knife substantially at right angles to the axis of the first knife to a predetermined end position in which the marginal portions of the two knives overlap but the knives are out of contact with each other, a second fluid-operated motor which is actuatable to move the first knife with respect to the carrier means substantially in the axial direction of the first knife, and control means for actuating the first and second motors in a given sequence, preferably not only when the first knife is to engage the second knife but also when the first knife is to be disengaged from the second knife.

The control means comprises a source of pressurized fluid (e.g., an air compressor), first conduit means which connects the source with the first motor, second conduit means which connects the source with the second motor, valve means which is installed in the first conduit means and is operable (e.g., by hand) to admit pressurized fluid to the first motor whereby the pressure in the first conduit means rises when the carrier means assumes its end position (i.e., when the first knife overlaps but is still out of contact with the second knife), and a threshold member which is installed in the second conduit means and is operable to permit pressurized fluid to flow from the source to the second motor when the pressure in the first conduit means rises to a predetermined value, i.e., to a value which is indicative that the carrier means has assumed its end position.

The threshold member may comprise valve means (e.g., a four-way valve) having a valving element (such as a spool) movable between first and second positions in which the valving element respectively seals the source from the second motor and allows pressurized fluid to flow from the source into the second motor, a spring or other suitable means for yieldably biasing the valving element to its first position, and a control line which connects the first conduit means with the second valve means to subject the valving element to the pressure of fluid in the first conduit means whereby the fluid moves the valving element to the second position against the opposition of the biasing means when the pressure in the first conduit means rises to the predetermined value.

The second motor preferably comprises a piston (e.g., a deformable membrane) and the second conduit means admits pressurized fluid to the second motor at one side of the piston. The control means preferably further comprises third conduit means which connects the first conduit means with the second motor at the other side of the piston by way of the second valve means; the second valve means is then arranged to admit pressurized fluid into the second motor via third conduit means in the first position of the valving element to insure that the first knife is held out of contact with the second knife.

The second conduit means preferably contains adjustable pressure regulating valve means which is installed between the source and the threshold member and can determine the pressure of fluid which causes the first knife to move axially toward engagement with the second knife.

The novel features which are considered as characteristic of the invention are set forth in particular in the appended claims. The improved cutting apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
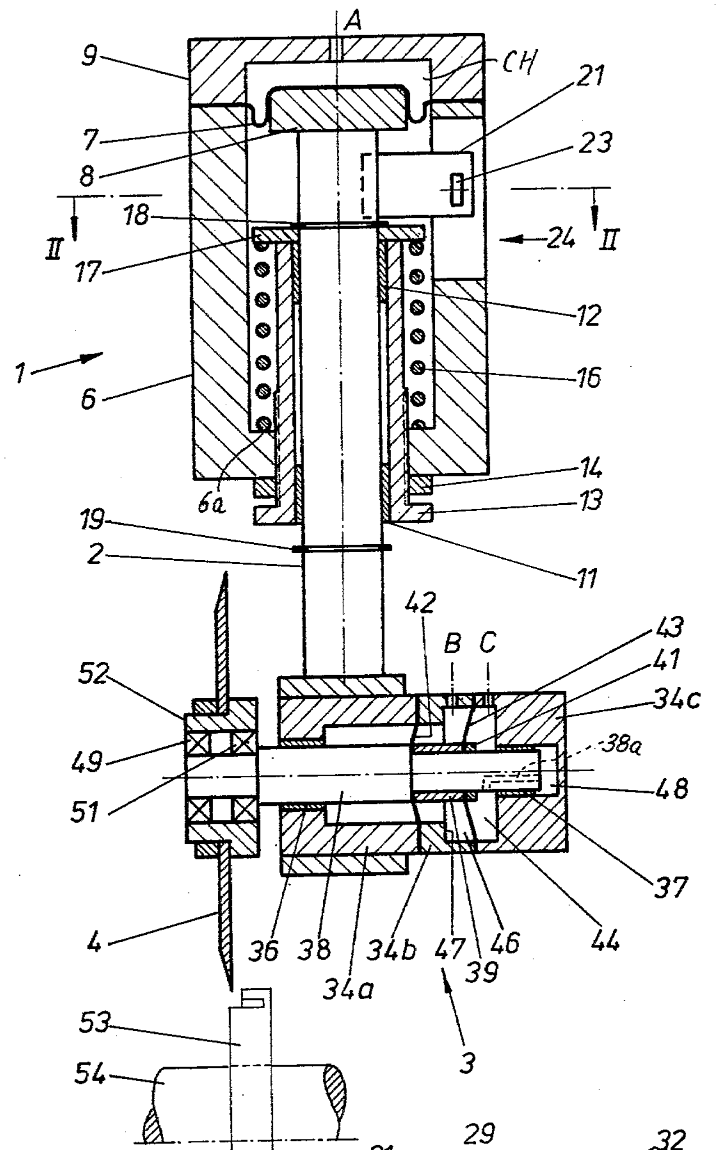
FIG. 1 is an axial sectional view of the apparatus, with the first knife located in its lower end position.
Figure 2:
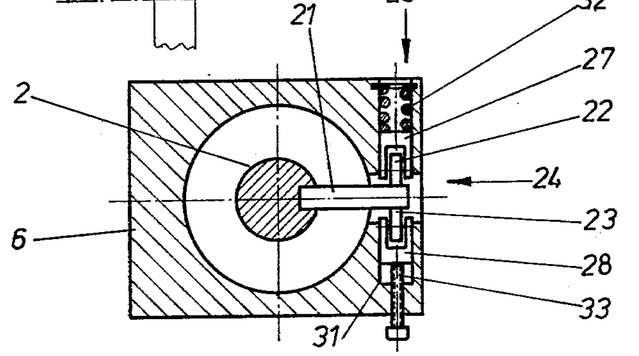
FIG. 2 is a sectional view as seen in the direction of arrows from the line II—II of FIG. 1.

The cutting apparatus which is shown in FIGS. 1 and 2 comprises a holder 1 for an elongated rod-shaped guide member here shown as a reciprocable piston rod 2 the exposed end portion of which is connected with a carrier 3 for a rotary disk-shaped knife 4. The holder 1 includes a cylinder 6 forming part of a first fluid-operated motor which can move the carrier 3 axially of the guide member 2 from an upper to a lower end position. The inner end portion or head 8 of the guide member 2 is overlapped by a deformable piston 7, here shown as a flexible membrane, whose marginal portion is clamped between a cover member 9 of the holder 1 and the adjacent end face of the cylinder 6. The cover member 9 has a port A for admission of a pressurized fluid into a chamber CH between the internal surface of the cover and the upper side of the membrane 7.

The guide member 2 is reciprocable in two friction bearings 11, 12 which are installed in the cylinder 6 in the interior of an elongated cylindrical sleeve 13. The latter has external threads which mate with the internal threads in the lower end portion of the cylinder 6, as viewed in FIG. 1. A lock nut 14 maintains the sleeve 13 in selected axial position with respect to the cylinder 6. A helical spring 16 reacts against an internal shoulder 6*a* of the cylinder 6 and bears against a disk 17 which surrounds the guide member 2 and abuts against a stop 18 here shown as a split ring which is recessed into a circumferential groove of the member 2. The spring 16 urges the guide member 2 axially in a direction to move the carrier 3 toward the cylinder 6, i.e., to shift the carrier 3 to the upper end position and to thereby reduce the volume of the chamber CH. A second stop 19 (here shown as a split ring which is recessed into a circumferential groove of the guide member 2) limits the extent of movement of the guide member under the action of the spring 16, i.e., the stop 19 determines the upper end position of the carrier 3. When the guide member 2 reaches the inner end position, the stop 19 abuts against the adjacent end face of the sleeve 13. FIG. 1 shows the carrier 3 in the lower end position in which the disk 17 abuts against the upper end face of the sleeve 13 and the stop 19 is remote from the lower end of the sleeve. The chamber CH is filled with pressurized fluid.

The orienting means for maintaining the guide member 2 in any one of a plurality of angular positions with reference to the cylinder 6 comprises a flat radial projection 21 (first abutment means) which is installed in the member 2 adjacent to the head 8 and extends into a slot 24 of the cylinder 6. The outer portion of the projection 21 is disposed between a first roller 22 and a second roller (second abutment means) 23. The rollers 22, 23 are mounted in the cylinder 6, i.e., the cylinder 6 can be said to constitute a support for the rollers. The rollers 22 and 23 are respectively rotatable in bifurcated bearing members 27, 28 which are reciprocable in sockets 29 and 31 extending from the slot 24 and into the cylinder 6. The axes of the sockets 29 and 31 are normal or nearly normal to the plane of the projection 21. The bearing member 27 for the roller 22 is biased toward the projection 21 by a helical spring 32 which is installed in the innermost portion of the socket 29, i.e., the spring 32 applies torque tending to turn the guide member 2 and the projection 21 in a clockwise direction, as viewed in FIG. 2. The bearing member 28 in the socket 31 is adjustable by a screw 33 which meshes with the cylinder 6 and whose head is accessible at the exterior of the holder 1. Thus, the axial position of the adjusting screw 33 determines the orientation of the guide member 2 with respect to the cylinder 6, i.e., the inclination of the knife 4.

The carrier 3 is a cylindrical body which is assembled of sections 34*a*, 34*b* and 34*c*. The sections 34*a* and 34*c* respectively contain friction bearings 36, 37 for a shaft 38 which is reciprocable with the knife 4 at right angles to the axis of the guide member 2. The shaft 38 carries clamping sleeves, including those shown at 39 and 41, which serve to clamp the median portions of annular membranes 42 and 43. The marginal portions of the membranes 42 and 43 are respectively clamped between the sections 34*a*, 34*b* and 34*b*, 34*c*. The membrane 43 divides the interior of the carrier 3 into compartments 44 and 46 and constitutes a deformable piston which cooperates with the cylinder including the sections 34*a*–34*c* to move the shaft 38 axially. The exposed (effective) area of the membrane 42 is smaller than that of the membrane 43 because the inner diameter of the section 34*a* is smaller than that of the section 34*c* (the cylindrical portion of the section 34*a* which extends inwardly beyond the internal surface of the section 34*c* is shown at 47). The purpose of the membrane 42 is to seal the compartment 46 from the space between the shaft 38 and the internal surface of the section 34*a*, i.e., to prevent escape of fluid from the compartment 46 toward the friction bearing 36. Sealing of the right-hand side of the compartment 44 (as viewed in FIG. 1) is not necessary because the friction bearing 37 is installed in a blind bore 48 of the section 34*c*. The shaft 38 is formed with one or more channels 38*a* which equalize the pressure in the blind bore 48 and the compartment 44.

The section 34*b* has a port B which communicates with the compartment 46, and the section 34*c* has a port C which communicates with the compartment 44.

That end portion of the shaft 38 which extends outwardly beyond the section 34*a* of the cylinder 34*a*–34*c* is surrounded by antifriction bearings 49, 51 for the hub 52 of the knife 4. The hub 52 is rigidly (preferably separably) connected with the knife 4 but is free to rotate with respect to the shaft 38. A second knife or counterknife 53 is mounted on a rotary drive shaft 54 adjacent to the path of axial movement of the knife 4 with the shaft 38. The means for driving the shaft 54 for the counterknife 53 comprises a suitable motor, not shown.

The shaft 38 constitutes the piston rod of a second fluid-operated motor, namely, of a double-acting pneumatic cylinder and piston unit whose cylinder is constituted by the sections 34*a*–34 *c* of the carrier 3 and whose piston is the membrane 43.

Figure 3:
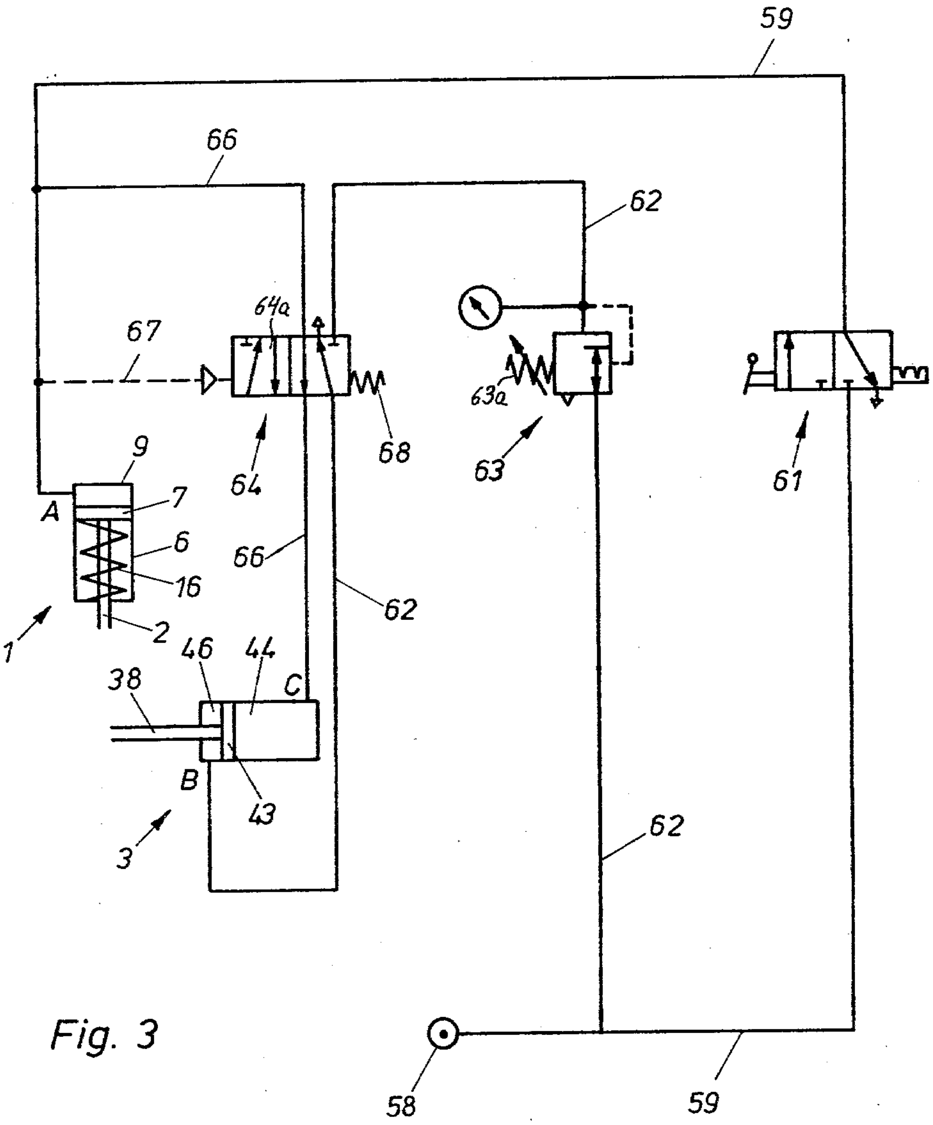
FIG. 3 is a diagram of the fluid-operated control system of the apparatus.

FIG. 3 shows schematically the holder 1, the carrier 3 and the elements of the pneumatic control circuit in the improved cutting apparatus. The control circuit comprises a source 58 of pressurized fluid (e.g., a source of compressed air) which is connected with the port A of the cover member 9 by a first conduit 59 containing a shutoff valve 61. The outlet of the source 58 is further connected with a second conduit 62 (which may but need not branch off the conduit 59 upstream of the valve 61) serving to supply pressurized fluid to the port B of the section 34*b*. The conduit 62 contains an adjustable pressure regulating valve 63 and a four-way valve 64. A third conduit 66, which is connected with the source 58 via first conduit 59 downstream of the shutoff valve 61, can admit pressurized fluid to the port C of the section 34*c* via valve 64. The valving element 64*a* of the valve 64 can be shifted by pressurized fluid via control line 67 which branches off the conduit 59 and is indicated by a broken line. The control line 67 communicates with the conduit 59 downstream of the valve 61. The valve 64 further comprises a spring 68 which yieldably biases the valving element 64*a* to the illustrated (first) position in which the source 58 is sealed from the port B but can admit pressurized fluid to the port C when the valve 61 is open. The spring 68 yields when the pressure in the control line 67 rises to a predetermined value, i.e., when the motor including the cylinder 6, piston or membrane 7 and the guide member or piston rod 2 has completed the movement of the carrier 3 to the lower end position in which the marginal portion of the knife 4 overlaps the marginal portion of the counterknife 53. It can be said that the valve 64 constitutes a threshold member which can admit pressurized fluid to the port C or to the port B (i.e., to the one or the other side of the membrane or piston 43) depending upon whether the pressure in the conduit 59 is above or below the aforementioned predetermined value. In its second position, the valving element 64*a* connects the port C with the atmosphere and allows pressurized fluid to flow into the port B.

The operation is as follows:

The valve 61 is actuatable by hand. When the attendant opens the valve 61 to admit pressurized fluid into the port A, the chamber CH is filled with fluid and the membrane (piston) 7 moves the guide member 2 axially downwardly, as viewed in FIG. 1, i.e., against the opposition of the spring 16. The conduit 59 further admits pressurized fluid into the conduit 66 and thence into the compartment 44 of the carriers 3 via port C. Thus, as the guide member 2 moves downwardly (as viewed in FIG. 1), the knife 4 is caused to move to its outer end position remote from the counterknife 53. In other words, when the knife 4 moves toward the drive shaft 54, it is invariably spaced apart from the counterknife 53.

While the guide member 2 moves against the opposition of the spring 16, its projection 21 (first abutment means) rotates the rollers 22 and 23 whereby the torque applying spring 32 insures that the selected angular position (orientation) of the guide member with respect to the cylinder 6 remains unchanged, i.e., the bearing member 28 for the roller 23 (second abutment means) bears against the adjusting screw 33. In other words, the guide member 2 reciprocates without any angular play. The axial movement of the guide member 2 in a direction to move the knife 4 toward the drive shaft 54 is terminated when the stop 17 reaches and abuts against the inner end face of the sleeve 13. As mentioned above, the sleeve 13 meshes with the cylinder 6, i.e., its axial position can be adjusted (and fixed by the lock nut 14) in such a way that the attendant can select the extent of overlap between the marginal portions of the knife 4 and counterknife 53.

When the guide member 2 reaches its fully extended position, the pressure in the conduit 59 rises with attendant rise of fluid pressure in the control line 67. Therefore, the valving element 64*a* of the valve 64 is shifted against the opposition of the spring 68 and the valve 64 connects the conduit 59 with the port B (via conduit 62) while simultaneously disconnecting the source 58 from the port C. The port B receives pressurized fluid via pressure regulating valve 63 in the conduit 62, and such fluid fills the compartment 46 to move the shaft 38 to the retracted position whereby the marginal portion of the knife 4 moves toward the counterknife 53. The shaft 38 is displaced by the membrane (piston) 43. At the same time, fluid which fills the compartment 44 is free to escape to the atmosphere via port C and valve 64.

The adjustment of the pressure regulating valve 63 is preferably such that the movement of the knife 4 toward the counterknife 53 takes place gradually and that the marginal portion of the knife 4 bears against the marginal portion of the counterknife 53 with a preselected force which can be varied by adjusting the bias of the spring 63*a* forming part of the pressure regulating valve 63. Once the knife 4 bears against the counterknife 53, it rotates the hub 52 with respect to the shaft 38 as soon as the motor for the drive shaft 54 is started.

The valve or threshold member 64 insures that the knife 4 is moved axially toward the counterknife 53 only when the pressure in the conduit 59 rises to the predetermined value, i.e., when the carrier 3 assumes its lower end position. This valve can be replaced by two components, namely, a valve and a threshold member; however, the illustrated structure wherein the valve 64 constitutes a threshold member is preferred owing to greater simplicity and lower cost of the control circuit. Since the compartment 44 receives pressurized fluid as soon as the valve 61 opens, the knife 4 cannot strike against the counterknife 53 while the carrier 3 moves to its lower end position. Thus, the knife 4 is held at a distance from the counterknife 53 (as considered in the axial direction of the shaft 38) while the motor including the cylinder 6 moves the carrier 3 to its lower end position.

The knife 4 need not and preferably should not wobble with respect to the shaft 38. In order to insure that the shaft 38 can move axially (if necessary) while the knife 4 bears against the counterknife 53, the piston 43 is a yieldable membrane which urges the shaft 38 in a direction to maintain the knife 4 in contact with the knife 53 as long as the compartment 46 receives pressurized fluid via valve 64, i.e., when the pressure of fluid in the conduit 59 rises to the predetermined value. The pressure regulating valve 63 insures that the knife 4 does not bear against the knife 53 with an excessive force.

By changing the axial position of the adjusting screw 33, an attendant can change the orientation (inclination) of the knife 4 with respect to the counterknife 53 with a very high degree of precision. Once the axial position of the screw 33 is changed, the angular position of the guide member 2 remains unchanged because the spring 32 causes the roller 22 to urge the projection 21 of the guide member 2 against the adjacent portion of the peripheral surface of the roller 23.

If the knife 4 is to be returned to the idle position, the attendant closes the valve 61 to seal the port A from the source 58 and to permit pressurized fluid to escape from the chamber CH via valve 61. The spring 16 is then free to expand and to move the stop 19 against the adjacent end face of the sleeve 13. At the same time, the spring 68 returns the valving element of the valve 64 to its first position in which the compartment 46 is free to communicate with the atmosphere. This reduces the pressure between the marginal portions of the knifes 4 and 53.

A machine wherein the improved cutting apparatus can be put to use is disclosed, for example, in U.S. Pat. No. 4,157,821 granted June 12, 1979 on application Ser. No. 854,835 filed Nov. 25, 1977 by Paul Fabrig. The machine normally comprises an entire battery of coaxial knives 4 which are movable with respect to associated counterknives. Such battery can subdivide a wide web into several strips which are thereupon severed by a transverse cutter to yield files of discrete sheets having a desired size and/or shape.

An important advantage of the improved apparatus is that the guide member 2 invariably remains in the selected one of several angular positions for any desired period of time, i.e., until intentionally adjusted by an attendant who rotates the screw 33 in order to turn the projection 21 against the opposition of the spring 32 or to enable the spring 32 to turn the projection 21 (and hence the guide member 2) in a clockwise direction, as viewed in FIG. 2. Moreover, the screw 33 enables an attendant to change the orientation of the knife 4 relative to the counterknife 53 while the cutting apparatus is in actual use, and the adjustment is not only precise but also simple and rapid. When the apparatus is in use, the spring 32 insures that the angular position of the guide member 2 remains unchanged, i.e., the projection 21 is held between the rollers 22 and 23 without any play.

The rollers 22 and 23 enable the projection 21 to move in parallelism with the axis of the guide member 2 with a minimum of friction. Thus, the energy requirements of the motor including the cylinder or support 6 and the membrane or piston 7 are not increased (or are increased only negligibly) due to the fact that the roller 22 is biased against the respective side of the projection 21.

It is presently preferred to rigidly connect the projection 21 with the guide member 2 and to make one of the rollers 22, 23 adjustable in a direction substantially transversely of the projection 21. This is desirable because the screw 33 for adjustment of the roller 23 is readily accessible at the exterior of the cylinder 6. However, it is also within the purview of the invention to provide means for adjusting the projection 21 with reference to the guide member 2, e.g., by mounting the projection on a hinge and by providing means for changing the inclination of the projection with reference to the guide member 2. It is also within the purview of the invention to provide adjustable abutment means on the guide member 2 and to further provide adjustable abutment means (such as the roller 23) in the cylinder or support 6.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the claims.

I claim:

1. In an apparatus for cutting paper sheets or the like, the combination of a first rotary knife; carrier means for said first knife; a rotary second knife; a first fluid-operated motor actuatable to move said carrier means with respect to said second knife substantially at right angles to the axis of said first knife to a predetermined end position; a second fluid-operated motor actuatable to move said first knife with respect to said carrier means substantially in the axial direction of said first knife; and control means for actuating said motors, including a source of pressurized fluid, first conduit means connecting said source with said first motor, second conduit means connected in parallel with said first conduit means and connecting said source with said second motor, valve means installed in said first conduit means and operable to admit pressurized fluid to said first motor whereby the pressure in said first conduit means rises when said carrier means assumes said end position, and a threshold member installed in said second conduit means and operable to permit pressurized fluid to flow from said source to said second motor when the pressure in said first conduit means rises to a predetermined value.

2. The combination of claim 1, wherein said threshold member comprises second valve means having a valving element movable between first and second positions in which said element respectively seals said source from said second motor and allows pressurized fluid to flow from said source to said second motor, means for yieldably biasing said valving element to said first position, and a control line connecting said first conduit means with said second valve means to subject the valving element to the pressure of fluid in said first conduit means whereby the fluid moves said valving element to said second position against the opposition of said biasing means when the pressure in said first conduit means rises to said predetermined value.

3. The combination of claim 2, wherein said second motor comprises a piston and said second conduit means admits fluid to one side of said piston, said control means further comprising third conduit means connecting said first conduit means with said second motor at the other side of said piston via said second valve means, said second valve means being arranged to admit pressurized fluid into said second motor via said third conduit means in said first position of said valving element.

4. The combination of claim 1, further comprising adjustable pressure regulating valve means installed in said second conduit means between said source and said threshold member.

5. The combination of claim 1, wherein at least one of said motors comprise a deformable piston.

6. The combination of claim 1, wherein said first motor comprises a piston rod connected with said carrier means.

7. The combination of claim 1, wherein said second motor comprises a piston rod coaxial with and rotatably supporting said first knife.

8. The combination of claim 1, wherein said fluid is a gas.

9. The combination of claim 8, wherein at least one of said motors comprises a double-acting cylinder and piston unit.

10. The combination of claim 8, wherein said threshold member comprises means for connecting said second motor with the atmosphere when said carrier means is out of said end position.

* * * * *